Feb. 8, 1938. J. H. ONIONS ET AL 2,107,494
SHOCK ABSORBENT STRUT FOR AIRCRAFT
Filed Aug. 19, 1936 2 Sheets-Sheet 1
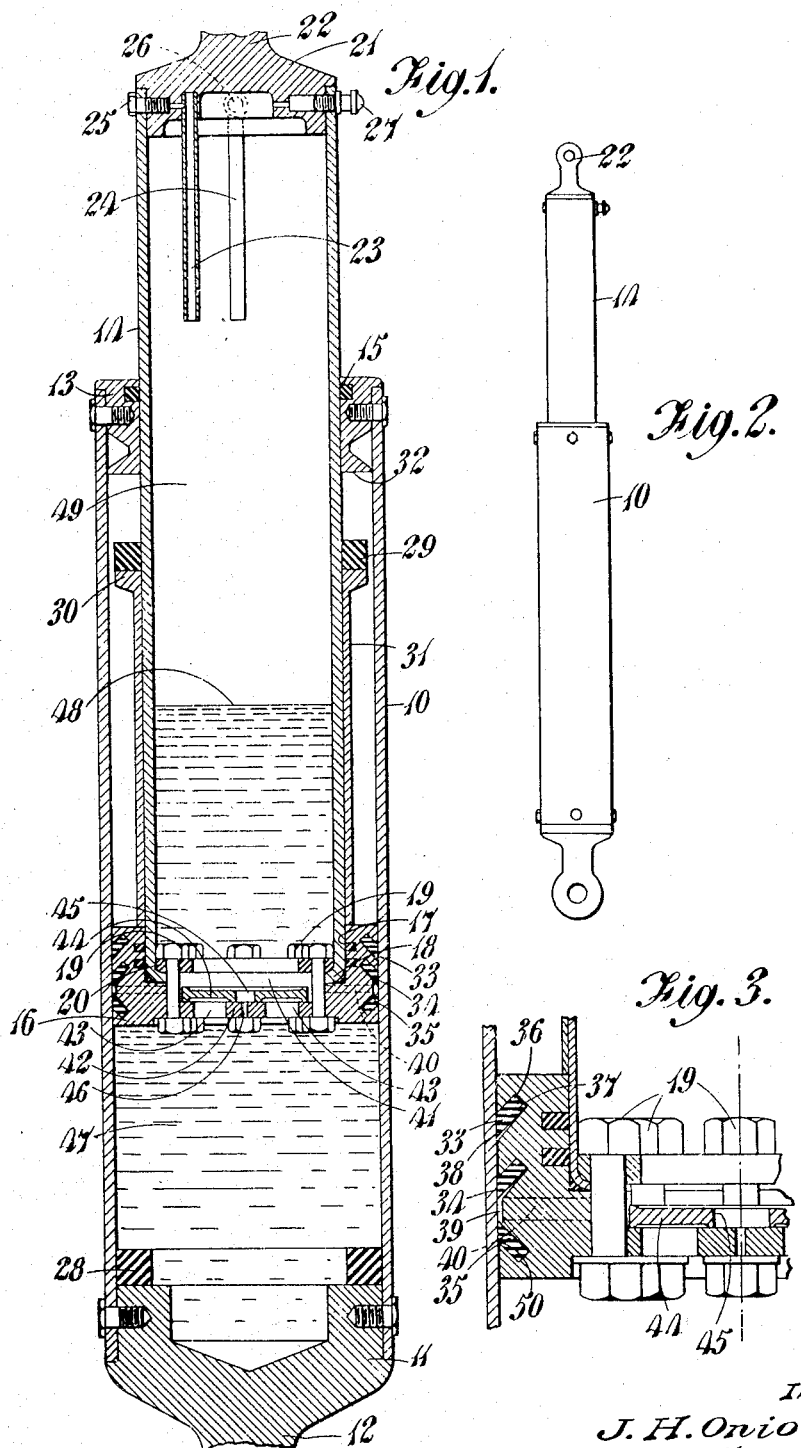
INVENTORS
J. H. Onions.
P. W. Thornhill.
By Lacey & Lacey,
Attys

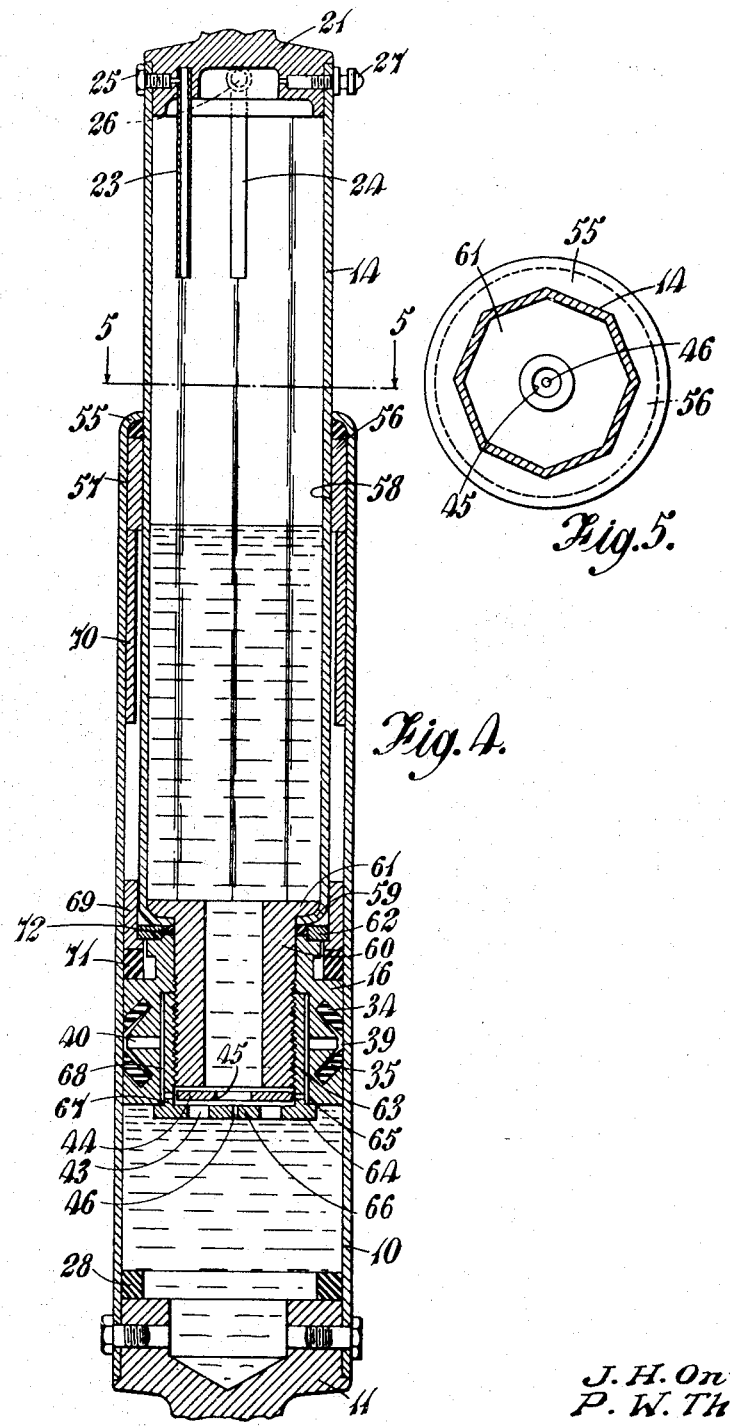

Patented Feb. 8, 1938

2,107,494

UNITED STATES PATENT OFFICE 2,107,494

SHOCK ABSORBENT STRUT FOR AIRCRAFT

John Henry Onions and Peter Warborn Thornhill, Leamington Spa, England; said Thornhill assignor to said Onions Application August 19, 1936, Serial No. 96,872
In Great Britain October 15, 1935

9 Claims. (Cl. 267—64)

This invention relates to resilient struts, particularly for aircraft, of the kind in which a plunger tube is slidably mounted within a cylinder tube, each being closed at a position remote from its inner end to provide an internal space of variable volume containing a liquid such as oil, and gas under pressure such as air, the liquid during relative reciprocation of the tubes in one or both directions being caused to pass through one or more restricted openings for damping this movement of the tubes, while the compressed gas provides the whole of the resilience normally required, the strut, of course, being capable of carrying a sustained normal axial load without becoming completely closed.

It is the primary object of the present invention to provide an improved construction of strut having characteristics which render it particularly satisfactory for incorporation in the landing gear of aircraft, for example, a low value of static friction coupled with high dynamic friction, particularly during an extension or rebound movement, the frictional load during such movement being widely distributed and being taken to some extent by the pressure of the plunger packing against the cylinder wall, as well as by the resistance of the liquid passing through the restricted opening or openings.

In a resilient strut of the kind referred to above having a plurality of resilient packing means carried by the inner end of the plunger tube, according to one feature of the invention the peripheral portions of two adjacent packing rings upon the plunger are both inclined axially towards one another, and preferably the intervening space is placed in communication with the liquid within the strut so that the fluid pressure thus created in said space tends to press said rings against the interior of the cylinder tube. It also prevents air entering on extension of the strut and it provides lubrication to the plunger head and packings.

The invention further provides a resilient strut of the kind referred to having the inner end of the plunger tube closed by a plunger head which is formed with a longitudinal passage controlled by a flutter valve for regulating the damping effect, the exterior of the plunger head being fitted with a plurality of packing rings co-operating with the internal surface of the cylinder tube, and the invention is characterized by the fact that the space between two of the said rings is connected with the interior of the plunger head by means of one or more passages which terminate against the edge of the flutter valve so that the passage or passages are placed in direct communication with one side of the flutter valve or the other side according to the position occupied by said valve whereby the said space is in communication with whichever side of the head is subject to the higher pressure. If desired, at least two of the packing rings are substantially frusto-conical in general form, their peripheral portions being shaped to provide surfaces co-acting with the interior of the cylinder, both of said peripheral portions being directed obliquely towards one another.

The preferred construction of resilient strut according to the invention has at least one of the tubes turned inwardly at its inner end, i. e. that end which overlaps the other tube, this turned-in portion enabling a plunger head to be easily secured in the case of the inner tube and permitting an improved form of limiting stop to be provided in the case of the outer tube. Thus the invention provides a resilient strut in which the plunger tube is turned inwardly at its inner end and is clamped axially to a plunger head, and the cylinder tube is also turned inwardly at its inner end to prevent excessive extension of the strut, one or more sleeves of anti-friction material conveniently being interposed between the plunger tube and the cylinder. If desired, a sleeve composed of anti-friction material is carried by the plunger tube but is slidably mounted in relation thereto, and an annular buffer of resilient material is interposed between this sleeve and an abutment carried by the plunger tube, said sleeve serving as a stop by which the maximum extension of the strut is limited, and the buffer being arranged to prevent shock when this limit is reached.

The invention is illustrated by way of example in the accompanying drawings, in which:—

Figure 1 is a sectional elevation drawn diagrammatically showing the internal arrangement of one form of strut;

Figure 2 is a side elevation to a reduced scale showing a strut of normal proportions constructed on the lines indicated in Figure 1;

Figure 3 is a fragmentary sectional elevation showing the details of the plunger head of the strut;

Figure 4 is a diagrammatic sectional elevation showing a modified method of construction; and Figure 5 is a sectional plan on the line 5, 5 of Figure 4.

In the first example shown in Figures 1 to 3 the principal parts of the strut consist of an outer cylinder tube 10 which is closed at its lower end by any suitable plug member 11 conveniently having an attachment lug 12, the other or "inner end" of the tube 10 being fitted with a bush 13 within which a plunger tube is slidably mounted, a soft packing ring 15 conveniently being fitted in the bush 13 to prevent the entrance of dust or other foreign matter into the cylinder tube 10.

The inner end of the plunger tube 14, i. e. that end which is overlapped by the inner end of the cylinder tube 10, carries a plunger head 16 which is formed at 17 with an axial recess fitting snugly over the outside of the tube 14, the end 18 of the latter being turned inwardly as shown and being clamped in position by a series of bolts 19 acting upon a clamping ring 20. By this means an extremely firm yet easily constructed joint is obtained.

At its outer end the plunger tube 14 is closed by a plug member 21, a lug 22 formed upon which serves as a convenient anchorage for the upper end of the strut. The plug member 21 is fitted with a pair of longitudinal tubes 23 and 24 communicating respectively with a pair of passages closed by removable plugs 25 and 26, while an air valve 27 also communicates with the interior of the plunger tube 14 by way of the plug member 21.

In order to limit the inward movement of the plunger tube 14 and to prevent shock when this limit is reached, an annular rubber or other resilient buffer 28 normally rests upon the plug member 11 and is engaged by the plunger head 16, while a similar buffer 29 surrounding the plunger tube 14 is supported by a shoulder 30 formed upon a distance tube 31 bearing at its other end upon the plunger head 16. Thus, when the maximum permissible extension has been obtained, further movement is arrested by the buffer 29 engaging with the under surface 32 of the bush 13.

Reverting to the plunger head 16 which is concerned mostly with the present invention, it will be seen that the external curved surface of this is provided with three packing rings 33, 34 and 35, each being of substantially frusto-conical shape and conveniently being composed of flexible material, such as rubber. For their accommodation, correspondingly shaped grooves having substantially parallel side walls are provided, these walls being indicated for example at 36 and 37 in the case of the ring 33 in Figure 3. Preferably the distance separating the said walls 36 and 37 is just a little in excess of the corresponding thickness of the packing ring, in order that liquid under pressure can enter the groove and act upon said ring in order to press it outwardly into firm contact with the interior of the cylinder tube 10. The outer part or periphery of each of the rings 33, 34 and 35 is, of course, shaped to conform to the cylindrical surface of the tube 10, and this provides a lip 38 in each case which is readily acted upon by fluid pressure to produce a tight sliding contact, the frictional resistance being approximately proportional to the fluid pressure exerted upon said lip. This action is utilized as will be hereinafter explained, but it will be noted that the two rings 34 and 35 have their outer parts directed obliquely towards one another, and the space 39 between them is connected by one or more passages 40 with a substantially cylindrical recess 41 formed in the plunger head 16. The lower wall 42 of this recess is formed with a circular series of comparatively large openings 43, which are capable of being covered by a plate 44 disposed within the recess 41 and constituting a flutter valve. The flutter valve 44 is centrally located by the bolts 19 but is permitted a limited axial movement in an upward direction as determined by the clamping ring 20, the centre of said flutter valve 44 being formed with an aperture 45 which is permanently in register with a constricted passage 46 drilled in the centre of the wall 42. A space 47 beneath the plunger head 16 is occupied completely by liquid, such as oil, and this extends into the plunger tube up to the level indicated at 48, while the space 49 above the liquid is occupied by compressed gas. When, therefore, the plunger tube 14 is forced into the cylinder tube 10, under the action say of the aircraft alighting upon the ground, the liquid in the space 47 is put under pressure forcing it to flow through the holes 43, lifting the flutter valve 44 and forcing up to the clamping ring 20. The fluid is permitted to pass freely through the comparatively large area of the holes 43 but receives a predetermined but relatively small amount of obstruction at the hole 45, thus causing the level 48 to rise and further compress the gas in the space 49. During this movement it will be noted that there is a difference in pressure between the liquid in the space 47 and that within the plunger tube 14, and, therefore, the flutter valve 44 is maintained in its raised position so that the space 39 between the rings 34 and 35 is always in communication with the space 41 and subject to the pressure therein.

Thus the higher pressure in the space 41 is caused to act upon the rings 34 and 35, which would tend to force both of them against the cylinder wall; but the ring 35 is subject, on its outer surface, to a balancing pressure from the space 47 and therefore on this stroke it does not exert any substantial amount of pressure on the cylinder wall, thus avoiding unnecessary friction. During the rebound movement, however, when the plunger tube 14 tends to become withdrawn from the cylinder tube 10 the flutter valve 44 will be forced on to the wall 42, and as a consequence the liquid from the plunger tube 14 has to pass through a very constricted passageway constituted by the hole 46. As a result a considerable difference in pressure is created between the liquid in the plunger tube 14 and that in the space 47, and the higher pressure is accordingly transmitted through the passages 40 to the space 39 where it acts effectually upon both of the packing rings 34 and 35. As a result increased retarding friction is produced between the two rings 34 and 35 on the one hand and the cylinder 10 on the other hand, and this increases the efficiency of the device as a shock absorber or damper. It will be realized that this mechanical friction is produced entirely as a result of the fluid friction induced by the flutter valve 44, and as a consequence its effect gradually diminishes as a state of equilibrium is reached. This is considered to be advantageous as it enables each strut of an aircraft to assume its position of equilibrium in a gentle but perfectly free manner, and thus ensures that the machine will always be correctly poised but, when the strut has to resist a heavy pulsating load, the resistance tending to damp out the consequent movement is not taken entirely by the liquid which is driven past the flutter valve, but is also in some measure absorbed and dissipated in the form of heat through the agency of the friction developed between the packing rings and the interior of the cylinder tube 10 on the extension stroke. In fact in the general design of strut according to the invention which has been found satisfactory for present-day aircraft, the frictional resistance offered by the packing rings during the compression stroke is usually less than one-half of the resistance encountered during the rebound or expansion stroke for any particular value of compression and tension load.

The ring 35 carries out the additional function of preventing air from the atmosphere entering the strut down the space between the tubes 14 and 10 and so entering the space 47 where there is a tendency for a vacuum to form on the extension stroke.

The pipes 23 and 24 enable exactly the correct quantity of liquid to be inserted when the strut is installed and also when it subsequently undergoes servicing and overhaul. For this purpose all air pressure is released through the air valve 27. The latter is then closed and the two plugs 25 and 26 are removed. The strut is then compressed to its full extent and oil is pumped in through one of the tubes, say 23. When the level reaches the bottom of the two tubes, the strut, of course, being maintained in a substantially vertical position, the oil is forced up the tube 24 and the two plugs 25 and 26 are then replaced. Air or other suitable gas is pumped in through the valve 27 until the requisite pressure is reached and the strut is then ready for use. It will be observed that the interior of the cylinder tube 10 and the packing rings are always maintained in an efficiently lubricated condition, as the oil or other working liquid is forced under pressure within the space 39 during each retracting movement of the plunger tube.

It will be seen in Figure 2 that in addition to its simple construction, the improved strut can readily be arranged so that there are practically no projecting parts, and this is extremely beneficial in the case of struts utilized in aircraft as the aerodynamic drag is consequently reducible to a comparatively small value.

In general arrangement the strut shown in Figures 4 and 5 is the same as that in the previous example, the upper end of the plunger tube 14 being closed by a combined plug and fixing bracket 21, while the lower end of the cylinder tube 10 is closed by a similar fitting 11. The upper or "inner" end of the cylinder tube 10 is however turned inwardly at 55, its inwardly facing edge being conveniently of octagonal shape as will be seen from Figure 5. An anti-friction sleeve 56 is mounted within the cylinder tube 10 and has its external surface 57 of circular cross-section to fit within said tube 10, while its interior 58 is octagonal in shape so as to receive in a slidable manner the plunger tube 14 which is composed of octagonal tube. By this means rotation of the plunger tube 14 relative to the cylinder tube 10 is readily prevented without incurring any appreciable increase in the total weight of the strut.

The portion which is always overlapped readily lends itself to the fitting thereto of any desired external part, without danger of damage to any packing or sliding surfaces.

At its inner end the plunger tube 14 is turned inwardly as indicated at 59, the shoulder so formed conveniently having a circular aperture through which passes the stem of a tubular bolt 60, the head 61 of which serves to clamp the turned-in portion 59 in firm engagement with a flat ring 62, which in turn bears upon the plunger head 16. An internally screw-threaded cap 63 serves as a nut for tightening up these parts, and is provided with a flange 64 which engages the lower surface of the plunger head 16 in a fluid-tight manner owing to the provision of a packing ring 65. A packing 72 is placed between the plunger head 16 and the turned-in edge 59 of the tube 14. The lower part 66 of the cap 63 also forms a housing for a flutter valve 44, which latter is permitted a limited axial travel between the parts 66 and the lower end of the bolt 60. The flutter valve 44 operates exactly as in the construction shown in Figure 1, and the chamber within which it is accommodated communicates by way of radial passages 67 with an annular clearance space 68 between the cap 63 and the plunger head 16, the latter being provided with radial passages 40 as before in order that the high pressure side of the flutter valve 44 may be automatically connected with the space 39 between a pair of packing rings 34 and 35, the peripheral portions of which are directed towards one another.

The compression of the strut is finally limited by an annular rubber or other resilient buffer 28 as before described, but in the present example the maximum retracting movement is governed by the engagement of an anti-friction sleeve 69 upon the plunger with a spacing tube 70 which bears at its upper end against the sleeve 56. In order to secure a resilient action the sleeve 69 is slidable relative to the plunger tube 14, and is flanged radially inwards at its lower end so as to provide a surface which bears against a resilient ring 71 forming part of the plunger head.

It will be understood that the invention is not limited to the example shown, as various other constructions may be evolved having the novel features now claimed. Moreover, it will be appreciated that where struts according to the present invention are required to operate satisfactorily regardless of their orientation in relation to the vertical, a freely mounted piston member (not shown) may be incorporated as described in co-pending United Kingdom patent application No. 22936 of 1935, this piston serving as a movable partition separating the liquid from the compressed gas within the plunger tube 14. Further, by suitable modification of the plugs 11 and 21 serving as the end boundaries of the space containing the operating liquid and gas, one or each of these plugs may be disposed intermediate the ends of the tube which it serves to close, thus enabling strut units of any desired length to be constructed irrespective of the volume required by the working fluids i. e. the liquid and the compressed gas, in order to obtain the desired load capacity and rate of compression for a given stroke.

What we claim is:—

1. An oleo-pneumatic shock absorbing strut comprising a cylinder tube, a plunger tube slidably mounted therein, a piston head on the inner end of the plunger tube and having a cavity, both of said tubes having means to close their outer parts so as to enclose a working space of variable volume, a flutter valve within a cavity formed in the piston head and adapted to move to either end of the cavity away from that side of the piston head which is acted upon by the greater fluid pressure, packing means around the piston head and comprising a pair of packing rings which are forced into contact with the cylinder by fluid pressure within a space between them, and a passageway leading from the middle portion of the flutter valve cavity to the space between the packing rings whereby said space is charged with pressure fluid from that side of the piston head having the greater pressure.

2. An oleo-pneumatic shock absorbing strut comprising a cylinder tube, a plunger tube slidably mounted therein, a piston head on the inner end of the plunger tube, said tubes having means closing their outer ends so as to enclose a working space of variable volume, packing rings surrounding the piston head and adapted to be pressed against the interior of the cylinder by fluid pressure within a space between them a cavity within the piston head having a pair of openings communicating with the spaces within the plunger tube and the cylinder tube respectively, a flutter valve within the piston head cavity and adapted to cover the opening leading to that space having the lesser fluid pressure, and a passage leading from the piston head cavity to the space between the packing rings whereby said space between the rings is fed with pressure fluid from that side of the piston head having the greater pressure.

3. An oleo-pneumatic shock absorbing strut comprising a cylinder tube, a plunger tube slidably mounted therein a piston head on the inner end of the plunger tube and having grooves, means closing the outer ends of both tubes so as to enclose a working space of variable volume, a cavity in the piston head, a flutter valve within the cavity and adapted to move to either end of the cavity away from that side of the piston head which is acted upon by the greater fluid pressure, packing means around the piston head and comprising rubber rings which are held by their resilience in the grooves, a passageway connecting a space between two of said rings with the cavity in the piston head so that said greater fluid pressure always acts between the packing rings and forces them into contact with the interior of the cylinder.

4. An oleo-pneumatic shock absorbing strut as claimed in claim 3, wherein the piston head is formed with a plurality of circumferential grooves each of which is approximately rectangular in radial section but has the major axis of its section arranged obliquely with regard to the axis of the piston head, each of the packing rings being correspondingly chamfered at its periphery so as to fit against the internal surface of the cylinder.

5. An oleo-pneumatic shock absorbing strut comprising a cylinder tube, a plunger tube slidably mounted therein, a piston head on the inner end of the plunger tube and means closing the outer ends of both tubes so as to enclose a working space of variable volume, the inner end of the plunger tube being turned inwardly and being clamped axially to the piston head, said piston head having a cavity, a flutter valve within the cavity, and a plurality of packing rings fitted to the exterior of the piston head, said piston head having a passageway connecting a space between the packing rings with the cavity in the piston head whereby said space is automatically connected with that side of the piston head acted upon by the greater fluid pressure.

6. An oleo-pneumatic shock absorbing strut comprising a cylinder tube, a plunger tube slidably mounted therein, a piston head on the inner end of the plunger tube, means closing the outer ends of both tubes so as to enclose a working space of variable volume, a cavity formed in the piston head, a flutter valve therein, a plurality of packing rings fitted to the exterior of the piston head, a passageway connecting a space between the packing rings with the cavity in the piston head whereby said space is automatically connected with that side of the piston head acted upon by the greater fluid pressure, said cylinder tube being turned inwardly at its inner end to engage slidably with the plunger tube.

7. An oleo-pneumatic shock absorbing strut as claimed in claim 6 in which the inwardly turned part of the cylinder tube is non-circular in shape and the corresponding part of the exterior of the plunger tube is of similar shape in order to prevent relative rotation between said plunger and cylinder tubes.

8. An oleo-pneumatic shock absorbing strut comprising a cylinder tube, a plunger tube slidably mounted therein, a piston head on the inner end of the plunger tube and means closing the outer parts of both tubes so as to enclose a working space of variable volume, a piston head upon the inner end of the plunger tube, packing means comprising a plurality of packing rings upon the exterior of the piston head, a cavity within said piston head bounded by end walls both having perforations, a flutter plate mounted within said cavity and formed with a central aperture, said flutter plate being arranged to close the perforations in one end wall of the cavity in the piston head with the exception of a relatively small hole serving to damp the extension of the strut by impeding the flow of fluid from the plunger tube to the cylinder, and a passageway connecting the interior of the cavity in the piston head with a space separating two of the packing rings whereby the flutter plate automatically places the space between the packing rings into communication with that side of the piston head which is acted upon by the greater fluid pressure.

9. An oleo-pneumatic shock absorbing strut comprising a cylinder tube, a plunger tube slidable therein, a piston head on the inner end of the plunger tube, means closing the outer ends of both tubes so as to enclose a working space of variable volume, a plurality of packing rings surrounding the piston head, a cavity in the piston head, a flutter valve within the cavity for damping the flow of fluid therethrough, a passageway from the cavity in the piston head to a space separating two of the packing rings so that said space is put into communication with that side of the piston head having the greater fluid pressure, an axially slidable collar upon the piston head, and an annular cushion member interposed between the end surface of said collar and the corresponding part of the piston head for forming a resilient stop for limiting the extension movement of the plunger and cylinder tubes.

JOHN HENRY ONIONS.
PETER WARBORN THORNHILL.